Patented Apr. 27, 1926.

1,582,858

UNITED STATES PATENT OFFICE.

MILTIADES REZOS, OF SAN FRANCISCO, CALIFORNIA, ASSIGNOR TO OLNEY PRESERVING CO., A COPARTNERSHIP CONSISTING OF WILLIAM OLNEY AND FRED STRUBLE, OF BERKELEY, CALIFORNIA.

METHOD OF TREATING BERRIES AND THE LIKE.

No Drawing.  Application filed December 10, 1925. Serial No. 74,624.

*To all whom it may concern:*

Be it known that I, MILTIADES REZOS, a citizen of the United States, residing at city and county of San Francisco and State of California, have invented new and useful Improvements in Methods of Treating Berries and the like, of which the following is a specification.

This invention relates to the preserving of strawberries and like fruits such as other berries, grapes, cherries, etc., in such a manner that the fruit will retain its original fresh flavor, color, and consistency, when used at a later date in making fruited candies and confections. Such fruit has heretofore been preserved by freezing. This practice as heretofore carried out has however been attended with difficulties and limitations in its success.

Before freezing the berries to be preserved, the same should be washed to remove all dirt, grit, etc. Washing of the berries in water before freezing seriously affects their quality, first by removing the natural color, and second by aiding fermentation which destroys both the color and flavor. My invention herein provides a washing process which avoids these objections and acts on the berries in a manner aiding in preserving their natural flavor and color. It is the object of my invention to provide such an improved process.

After experimenting with various solutions and processes, I have found that by washing the berries in a weak mucilaginous solution prior to freezing the same, the berries retain their original color, flavor and consistency after being frozen over a long period of time. While my process can be carried out with various degrees of success by using different materials to form the mucilaginous solution, I have found that tragacanth gum and gum arabic are best adapted to the purpose, the tragacanth being preferable for various reasons such for example, because of its cheapness.

The preferred manner of practicing my invention is substantially as follows.

I dissolve one pound of #3 tragacanth in one hundred pounds of water. This may best be done by dividing the tragacanth and water each into three parts and using three separate containers, using only cold water (not hot or boiling). This mixture should be allowed to stand for twenty-four hours and then strained to remove the undissolved lumps, then more water should be added to these lumps and the same permitted to stand for twenty-four hours longer or more if necessary to thoroughly dissolve the tragacanth.

The resulting solution should not be thick, the consistency of a light syrup being about right. This may be ascertained by taking a bit of the solution between the fingers and judging the same by the "feel". A hydrometer cannot be used with this solution, since the specific gravity of tragacanth is very nearly the same as that of water.

The strawberries are placed in sufficient of the solution to just cover the berries. The berries are then washed by stirring the same with a broad paddle. A strainer may thereafter be used to remove the berries from the solution. The solution can be used over and over again until it gets too thin, this being shown by the "feel".

Upon removing the berries from the solution, they are at once placed into the final packing containers, the smallest convenient containers preferably being used. It is important never to use a container larger than a standard half-barrel. Layers of sugar are spread between the berries in the containers, preferably using not more than one part of sugar to four parts of berries. More sugar can be used if desired, but such use will increase the cost of the product. The berries as thus packed are thereafter frozen and kept in such condition, ordinarily at about 15° temperature, until desired for use.

When the containers are opened for use at a later date, the berries will be found in the same natural state as when first placed in storage. The most important feature of my process is that it prevents any oxidation in the berries. It is this oxidation that has heretofore destroyed the color and flavor of stored strawberries. The fact that the tragacanth prevents oxidation may be proven by placing iron nails in such solution. After several days, these nails will be found to be as clean as when first immersed therein. If the nails are placed in water, they will very quickly turn dark from oxidation. The tragacanth solution also completely prevents any mold forming.

It will be understood that the berries must be cooked for use as soon as they are removed from the cold storage. Berries thus prepared by my process will be found to have the same natural color, flavor and consistency as though made directly from fresh fruit. It may also be stated that my process permits washing of the berries before freezing and furthermore reduces the amount of sugar required from the usual 1 to 2 ratio to a 1 to 4 ratio.

My invention is particularly applicable to strawberries, which berries are particularly desirable for use in manufacturing confections and which fruit is difficult to keep in its natural state because of its delicate nature. It will be understood however that my invention can also be used in connection with grapes, raisins, raspberries, etc.

Having thus described my invention, what I claim is:

1. The process of preserving berries and the like, consisting of washing the same in a weak, mucilaginous solution such as tragacanth, gum arabic, etc., and thereafter freezing the berries.

2. The process of preserving berries and the like, consisting of washing the same in a substantially one per cent mucilaginous solution such as tragacanth, gum arabic, etc., and thereafter freezing the berries.

3. The process of preparing berries and the like for preserving by freezing, consisting of washing the berries in a weak solution of tragacanth.

4. The process of preparing berries and the like for preserving by freezing, consisting of dissolving approximately one pound of tragacanth in one hundred pounds of cold water and washing the berries therein prior to freezing the same.

5. The process of preserving berries and the like, consisting of washing the same in a weak mucilaginous solution such as tragacanth, gum arabic, etc., packing the berries in containers with sugar, and thereafter freezing the berries.

6. The process of preserving berries and the like, consisting of washing the same in a weak solution of tragacanth, packing the berries with a relatively small proportion of sugar in contact therewith, and thereafter freezing the same.

MILTIADES REZOS.